(12) United States Patent
Chen

(10) Patent No.: US 6,191,588 B1
(45) Date of Patent: Feb. 20, 2001

(54) METHODS AND APPARATUS FOR IMAGING EARTH FORMATION WITH A CURRENT SOURCE, A CURRENT DRAIN, AND A MATRIX OF VOLTAGE ELECTRODES THEREBETWEEN

(75) Inventor: Min-Yi Chen, West Redding, CT (US)

(73) Assignee: Schlumberger Technology Corporation, Ridgefield, CT (US)

(*) Notice: Under 35 U.S.C. 154(b), the term of this patent shall be extended for 0 days.

(21) Appl. No.: 09/116,017

(22) Filed: Jul. 15, 1998

(51) Int. Cl.$^7$ ........................................................ G01V 3/20
(52) U.S. Cl. ............................................. 324/367; 324/371
(58) Field of Search .................................... 324/366, 367, 324/371, 374

(56) References Cited

U.S. PATENT DOCUMENTS

| | | | |
|---|---|---|---|
| 2,786,178 | * 3/1957 | Doll | 324/367 |
| 2,951,982 | * 9/1960 | Schuster | 324/367 |
| 3,076,138 | * 1/1963 | Stelzer | 324/366 |
| 3,564,914 | * 2/1971 | Desai et al. | 324/367 X |
| 4,236,113 | 11/1980 | Wiley | 324/366 |
| 4,468,623 | 8/1984 | Gianzero et al. | 324/367 |
| 4,567,759 | 2/1986 | Ekstrom et al. | 73/152 |
| 4,677,385 | 6/1987 | Chapman et al. | 324/366 |
| 4,692,908 | 9/1987 | Ekstrom et al. | 367/27 |
| 4,931,736 | * 6/1990 | Barlai et al. | 324/367 |
| 5,008,625 | * 4/1991 | Chen | 324/367 X |
| 5,049,822 | * 9/1991 | Zoltan et al. | 324/367 |

FOREIGN PATENT DOCUMENTS

| | | | |
|---|---|---|---|
| 0 343 744 | 11/1989 | (EP) | G01V/3/20 |
| 0 581 686 | 2/1994 | (EP) | G01V/3/22 |

* cited by examiner

*Primary Examiner*—Gerard Strecker
(74) *Attorney, Agent, or Firm*—William B. Batzer; David P. Gordon

(57) ABSTRACT

The borehole imaging apparatus of the present invention includes a tool having an array of voltage electrode buttons mounted on a non-conductive pad. A current source and a current return are preferably located on the non-conductive pads at opposite ends thereof. The locations of the current source and return are designed to force a current to flow in the formation parallel to the pad face and non-parallel to the formation boundary layers. According to a method of the invention, the voltage difference between a pair of buttons in the array is proportional to the resistivity of the formation bed adjacent to the buttons. The ratio of voltage differences between two nearby pairs of electrode buttons provides a quantitative measurement of the ratio of shallow resistivity. The resolution of the image produced by the new tool is determined only by the spacing of the buttons. The tool according to the invention produces much better images than the prior art tools when used in OBM wells. In order to assure that current flow is not tangential to bed boundaries, it is preferred that the non-conductive pad be provided with a pair of orthogonal current sources and current returns. According to a presently preferred embodiment of the invention, the voltage electrodes are arranged in a matrix having offset rows and measurements are made for adjacent electrodes in two dimensions.

31 Claims, 13 Drawing Sheets x Rcake/R=1
o Rcake/R=10
+ Rcake/R=1000

METHODS AND APPARATUS FOR IMAGING EARTH FORMATION WITH A CURRENT SOURCE, A CURRENT DRAIN, AND A MATRIX OF VOLTAGE ELECTRODES THEREBETWEEN

This application is related to co-owned U.S. Pat. No. 4,468,623, co-owned U.S. Pat. No. 4,567,759, and co-owned U.S. Pat. No. 4,692,908. The complete disclosure of each of these co-owned U.S. Patents is hereby incorporated herein by reference.

BACKGROUND OF THE INVENTION

1. Field of the Invention

The present invention relates to the investigation of earth formations. More particularly, the invention relates to methods and apparatus for electrically imaging the wall of a borehole.

2. State of the Art

When analyzing a hydrocarbon well, it is desirable to identify earth formation features at various borehole depths. Some of the formation features which are desirable to identify include fine beddings and facies, the heterogeneity of carbonate deposits and the structure of fractures.

The detection of beddings involves detecting shaly-sand sequences where the shales establish a basal contact for each sequence. Facies identification involves identifying the lithology between basal contacts. The analysis of carbonates involves detecting non-homogenous features such as those due to irregular cementation, variations in the pore sizes, small scale lithology changes, etc. Fractures play a major role in the flow characteristics of reservoir rock. Therefore, the measuring or detecting of fractures, determining their orientations, density, height, vertical and lateral continuity is highly desirable.

Co-owned U.S. Pat. No. 4,468,623 to Gianzero et al. (the '623 patent) discloses an earth formation investigating tool which can detect borehole wall features which are only millimeters in size. As shown in prior art FIGS. 1 and 2, the tool 10 includes an array 12 of small survey electrodes (buttons) 14a–14l mounted on a conductive pad 16 which is pressed against the borehole wall 18. A constant current source is coupled to each button such that current flows out of each button 14 into the adjoining formation, perpendicular to the borehole wall 18 as illustrated in FIG. 1 by the arrows $E_1$, $E_2$. The current returns to an electrode (not shown) which is located at or near the surface, or on another part of the tool 10. The individual button currents are monitored and recorded (by an uphole processor 20) as the tool 10 is moved through the borehole. The measured button currents are proportional to the conductivity of the material in front of each button. The conductivities are plotted as a function of depth to form a "wiggle trace" (or log) which can be analyzed to identify formation features at the different borehole depths.

Co-owned U.S. Pat. No. 4,567,759 to Ekstrom et al. (the '759 patent) discloses a method and apparatus for producing a high resolution image from the data collected by the tool described in the '623 patent. According to the methods of the '759 patent, signals from a conductivity measuring tool are processed to compensate for conditions such as variation in tool velocity, variations in borehole environment, etc. This processing enables subsequent signal enhancements with which the signals can be displayed in a manner that approaches the character of a visual image of the borehole wall taken from inside the borehole. Since the human eye is highly perceptive, fine high resolution features of the borehole wall can be visually discerned and interpreted. Such features include minute variations in the borehole wall in both the circumferential as well as vertical directions. Features which can be discerned from the image include vugs, small stratigraphy beds with their circumferential thickness variations, small scale lithology changes, pore sizes, fractures with their density, height, vertical and lateral continuity, etc.

Further enhancements to the methods and apparatus of the '623 patent and the '759 patent are disclosed in co-owned U.S. Pat. No. 4,692,908 to Ekstrom et al.(the '908 patent). The '908 patent discloses an acoustic method and apparatus for measuring the distance between the electrode buttons and the borehole wall. This distance is likely to change as the tool is moved through the borehole. Distance measurements made according to the '908 patent are recorded and used to correct the conductivity measurements if deemed necessary.

As disclosed in the '623 patent, the size and spacing of the electrode buttons is important to obtain good resolution and signal to noise ratio. In particular, the buttons should be closely spaced for high resolution and small in area for good spatial bandwidth. If the buttons are too small, however, the signal to noise ratio (SNR) is adversely affected. This is demonstrated by analyzing the current flow through the buttons into the formation. For example, as shown in prior art FIG. 1, buttons 14a and 14b are located on opposite sides of a bed boundary B which separates beds having different resistivities $R_1$ and $R_2$. Assuming that the pad 16 is in perfect contact with the borehole wall 18, the electric field near the pad 16 is perpendicular to the pad face or parallel to the bed boundary B. The parallel component of the electric field is continuous across the two different media as shown by $$E_1 = E_2 \quad (1)$$

where $E_1$ and $E_2$ are the electric fields on the two sides of the bed boundary B. In an ideal case, with an infinitely long pad, the equipotential surfaces near the center of the pad are all parallel to the pad face and the electric field is constant. The current density $j_i$ flowing into each bed is proportional to the conductivity $\sigma_i$ of that bed as shown according to $$j_i = E\sigma_i \quad (2)$$

If the conductivity $\sigma$ of the formation is continuously varying, then the current density $j$ may be expressed by $$j = E\sigma \quad (3)$$

The electric current $I_b$ flowing into a button is therefore the integral of the current density over the area of the button according to $$I_b = \int j \cdot da = E \cdot \int \sigma da \quad (4)$$

The electric field E depends on the conductivity distribution away from the pad and is not calibrated. Therefore, the button current is not a quantitative measure of the local conductivity. However, if one computes the ratio of button currents at two nearby points, the unknown Es cancel out. Thus, the ratio of the currents passing through two nearby buttons is a quantitative measurement of the ratio of shallow conductivities. From the foregoing, it will be appreciated that the size and spacing of the electrode buttons will govern resolution and SNR, and that resolution can be increased only at the expense of decreasing SNR.

The methods and apparatus thus far described with reference to the co-owned '759 and '623 patents are known in the art as FMI™, a trademark of Schlumberger and an abbreviation for "formation micro imager". FMI™ has been widely successful in producing accurate images of boreholes when used in wells which have been drilled with water based mud (WBM). However, the FMI™ produces lower quality images in wells which have been drilled with oil based mud (OBM).

At the present time there are no tools available which can produce borehole images in an OBM well which are comparable in quality to the images produced by FMI™ in a WBM well. Despite this fact, the use of OBM in well drilling is increasingly popular.

It is believed that in an OBM well non-conductive mudcake between the conductor buttons and the borehole wall interferes with the conductivity measurements.

SUMMARY OF THE INVENTION

It is therefore an object of the invention to provide methods and apparatus for accurately imaging a borehole wall in an OBM well.

In accord with this object which will be discussed in detail below, the imaging apparatus of the present invention includes a tool similar to the FMI™ tool having an array of electrode buttons mounted on a pad. However, according to the invention, the pad is non-conductive and the buttons are voltage electrodes rather than current electrodes. In the preferred embodiment, a current source and a current return are located at opposite ends of the non-conductive pad; although the current source and current return may be located off the pad. However, whether located on or off the pad, the locations of the current source and return are designed to force a current to flow in the formation parallel to the pad face and preferably orthogonal to the formation boundary layers. According to a method of the invention, the voltage difference between a pair of buttons in the array is proportional to the resistivity of the formation bed adjacent to the buttons. The ratio of voltage differences between two nearby pairs of electrode buttons provides a quantitative measurement of the ratio of shallow resistivity in the beds. The resolution of the image produced by the new tool is determined only by the spacing of the buttons.

The tool according to the invention produces much better images than the FMI™ tool when used in OBM wells. In order to assure that current flow is not tangential to bed boundaries, it is preferred that the non-conductive pad be provided with a pair of substantially non-parallel (e.g., orthogonal) current sources and current returns. According to a presently preferred embodiment of the invention, the voltage electrodes are arranged in a matrix having offset rows and measurements are made for adjacent electrodes in two dimensions.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
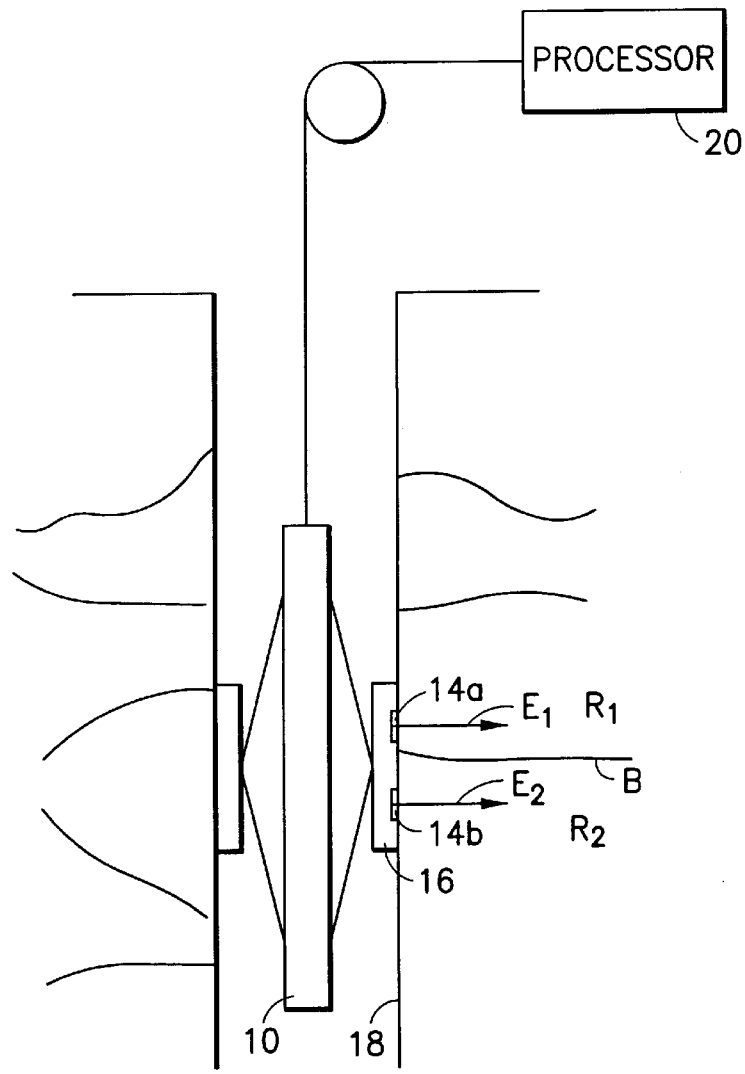
FIG. 1 is a schematic illustration of a prior art borehole imaging tool.
Figure 2:
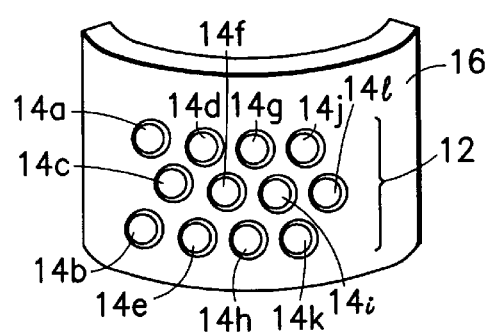
FIG. 2 is a schematic illustration of the electrode pad of the prior art tool of FIG. 1.

Referring now to FIGS. 1–3 and 4a, the imaging apparatus of the present invention includes a tool similar to the FMI™ tool shown in prior art FIG. 1 but having an array of voltage electrode buttons mounted on a non-conductive pad. According to the invention, a non-conductive pad 30 preferably made from rubber or ceramic is provided with an array of voltage electrodes 32a–32t. In the preferred embodiment, a current source 34 and a current return 36 are located at opposite ends (top and bottom) of the non-conductive pad 30. In alternative embodiments (not shown) the current source and return are located either on centralizers above and below the pad, or on neighboring pads. Regardless of whether the current source 34 and current return 36 are located on the non-conductive pad 30, the locations of the current source 34 and return 36 are designed to force a current to flow in the formation parallel to the pad face and non-parallel to the formation boundary layers. As described in more detail below with reference to FIGS. 9–12, due to the nature of formation boundary layers, it is preferable to provide a second current source 38 and second current return 40 which are arranged along a line which is orthogonal to the line along which the first current source 34 and current return 36 are arranged. The first current source and current return and the second current source and current return are preferably on at different times. If desired, a single switched current supply can be used to supply both current sources; or, if desired, separate current supplies can be provided.

Figure 4A:
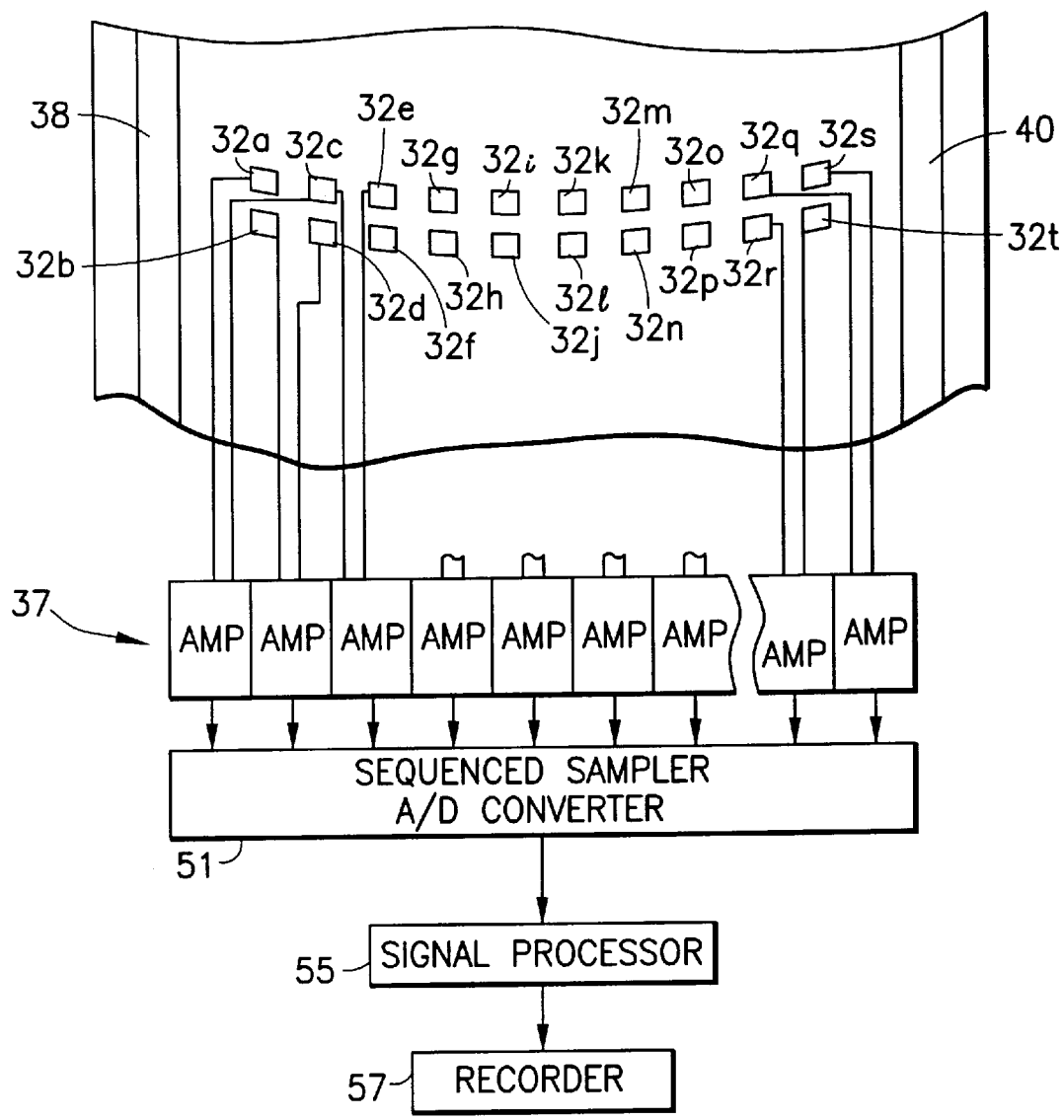
FIG. 4a is a part schematic and part block diagram of an imaging tool according to the invention.

As seen in FIG. 4a, the voltages measured at the voltage electrodes are utilized in providing measurements and images as discussed below. In particular, voltages from adjacent voltage electrodes 32 (e.g., 32a and 32c, 32c and 32e) are provided to a bank of amplifiers 37 which amplify the voltage differences (although a single switched amplifier could be used). As is known in the art, the outputs of the amplifiers 37 may be sampled sequentially and A/D converted by sampler/converter block 51. In turn, the output of block 51 is preferably processed by signal processor 55 and recorded by recorder 57. The output of recorder 57 may be a log(s), an image(s), or raw data.

Figure 4B:
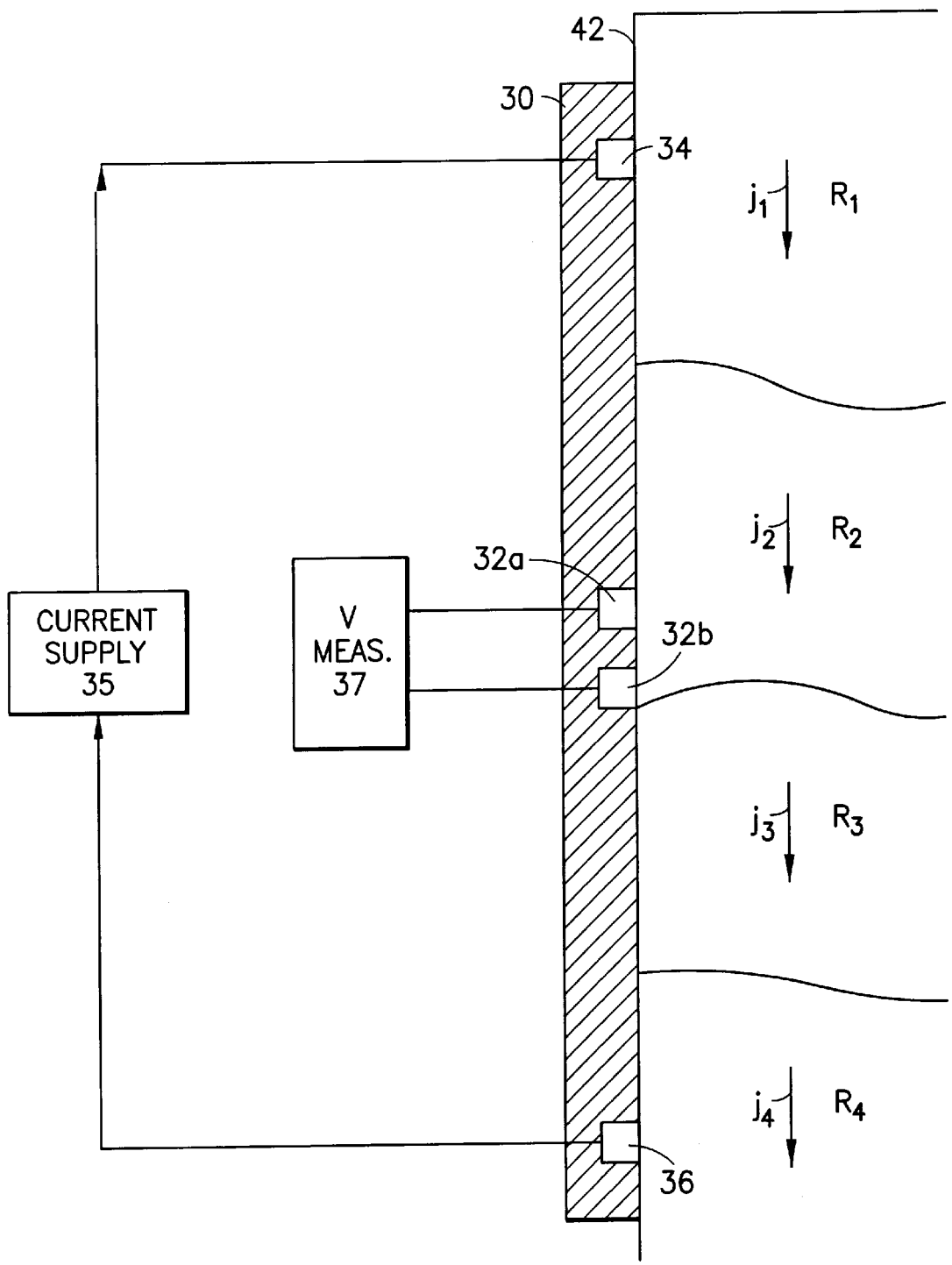
FIG. 4b is a schematic illustration of vertical current flow parallel to the electrode pad of the invention.

The basic theory of operation of the invention is explained with reference to FIG. 4b. FIG. 4b is a schematic illustration of a pad 30 according to the invention in perfect contact with the wall 42 of a borehole in a formation having four beds with different resistivities $R_1$, $R_2$, $R_3$, $R_4$. A current supply 35 is coupled to the electrodes 30, 36, and a voltage measuring (amplifying) circuit 37 is coupled to pairs of the electrodes 32, e.g. 32a, 32b. According to the invention, current flows from the source 34 to the return 36 such that the current density near the pad 30 is substantially parallel to the pad face and (in many situations) substantially perpendicular to the bed boundaries. According to the laws of physics, the perpendicular component of the current density j remains constant across the formation beds:

$$J_1 = J_2 = J_3 = J_4 \quad (5)$$

The voltage difference $(\delta V)_i$ between a pair of electrodes located on the same $i^{th}$ bed is given by $$(\delta V)_i = DjR_i \quad (6)$$

where D is the distance between the two electrodes, j is the constant current density, and $R_i$ is the resistivity of the $i^{th}$ bed. If the two electrodes are each located in a different bed, then the voltage difference between the electrodes is the one dimensional integral $$\delta V = j \int R \, dl \quad (7)$$

where dl is the distance between the two electrodes.

The current density j depends on the resistivity distribution away from the pad 30, and is not easy to calibrate. Therefore, the voltage difference ($\delta V$) is not a quantitative measurement of local resistivity. However, according to a method of the invention, the ratio of voltage difference $(\delta V)_1$ and voltage difference $(\delta V)_2$ between two nearby pairs of electrode buttons provides a quantitative measurement of the ratio of shallow resistivity. As can be appreciated from relationships 6 and 7, the resolution of the image produced by the imaging tool of the invention is determined only by the spacing of the buttons.

Those skilled in the art will appreciate that relationships 6 and 7 (as well as 4) assumes an infinitely long pad in perfect contact with the formation. However, as proven with the prior art FMI™ tool and in subsequent tests by the inventors herein, finite pad size and imperfect pad contact do not significantly impede the ability of the tool of the invention to make meaningful measurements.

Figure 5:
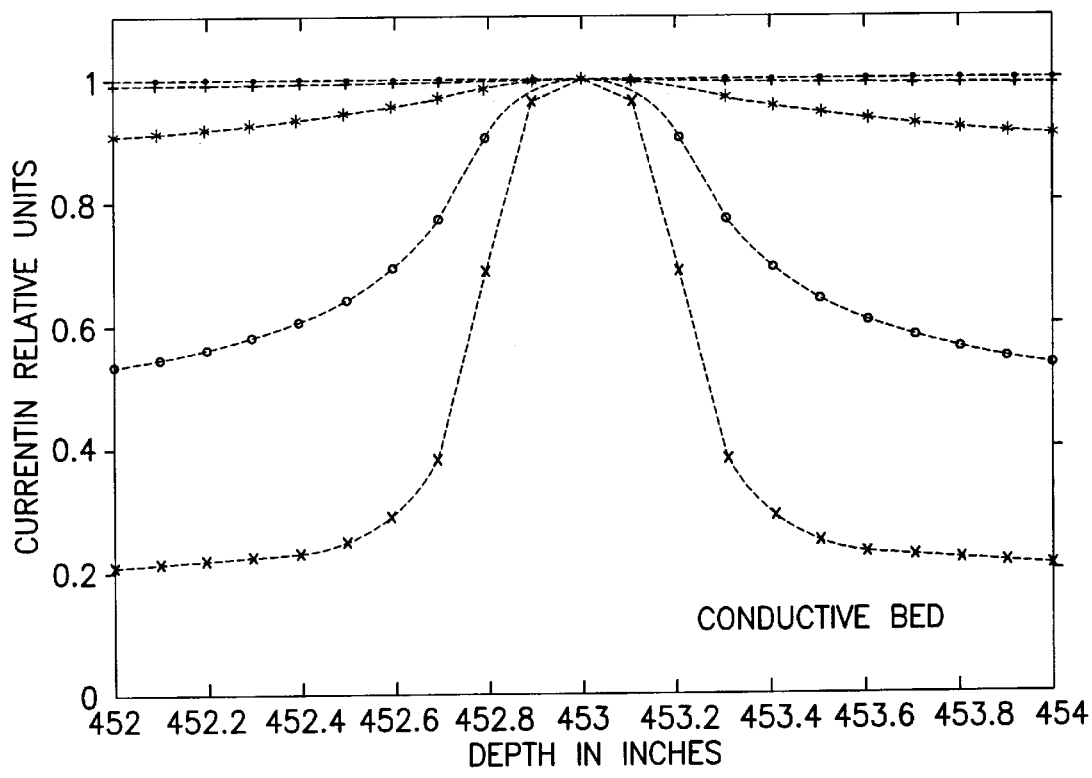
FIG. 5 is a graph showing five plots of current against depth in a conductive bed covered with resistive mudcakes of different resistivity, the current measurements having been made with a prior art FMI™ tool.
Figure 6:
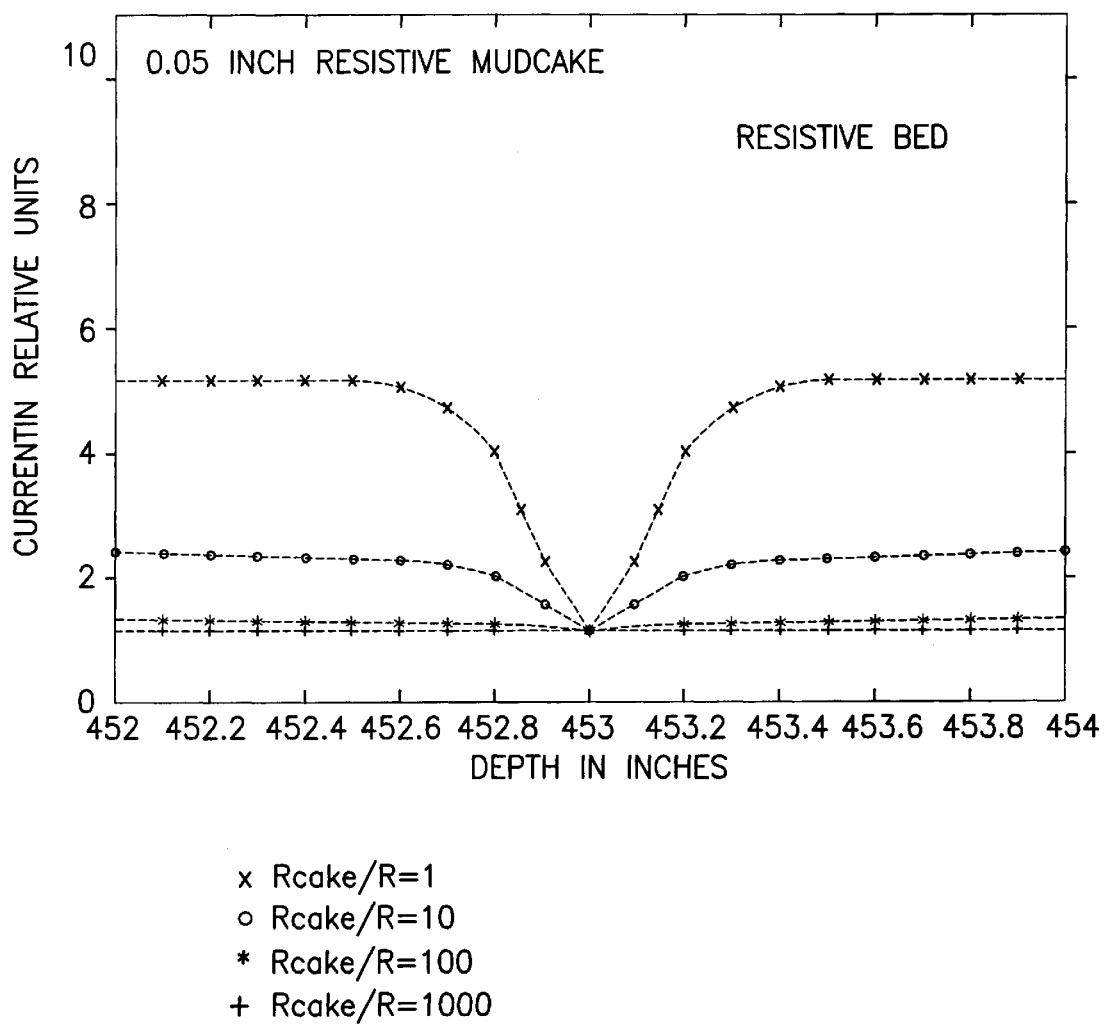
FIG. 6 is a graph similar to FIG. 5 where the measurements have been taken in a resistive bed.
Figure 7:
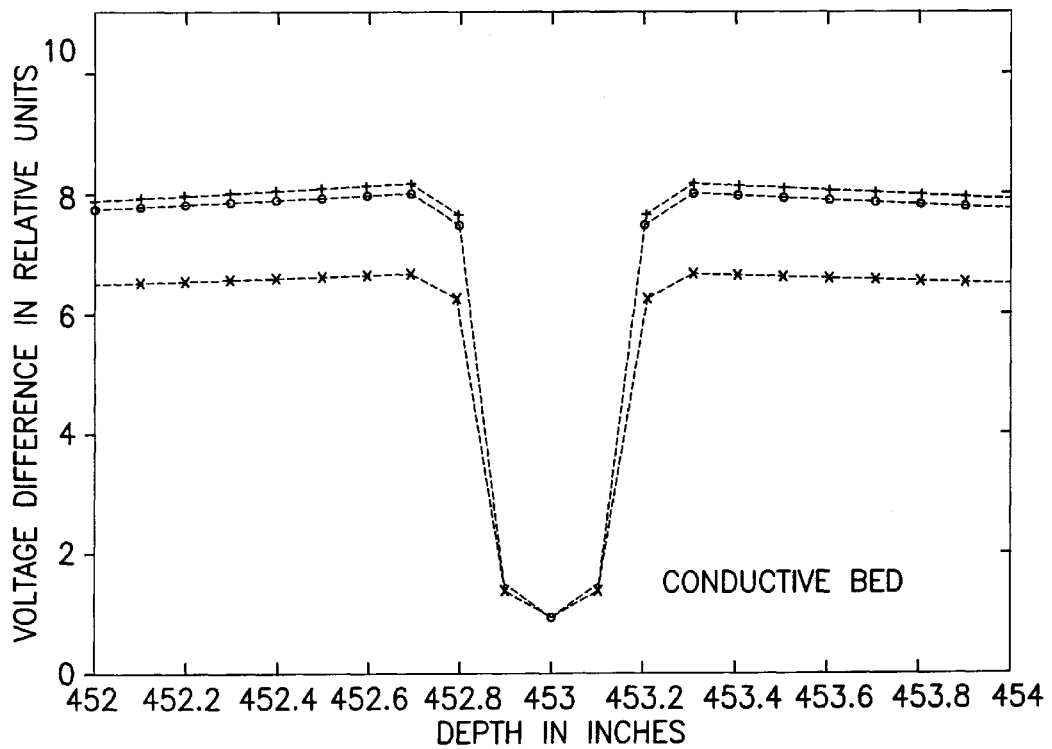
FIG. 7 is a graph showing five plots of voltage against depth in a conductive bed covered with resistive mudcakes of different resistivity, the voltage measurements having been made with a tool according to the invention.
Figure 8:
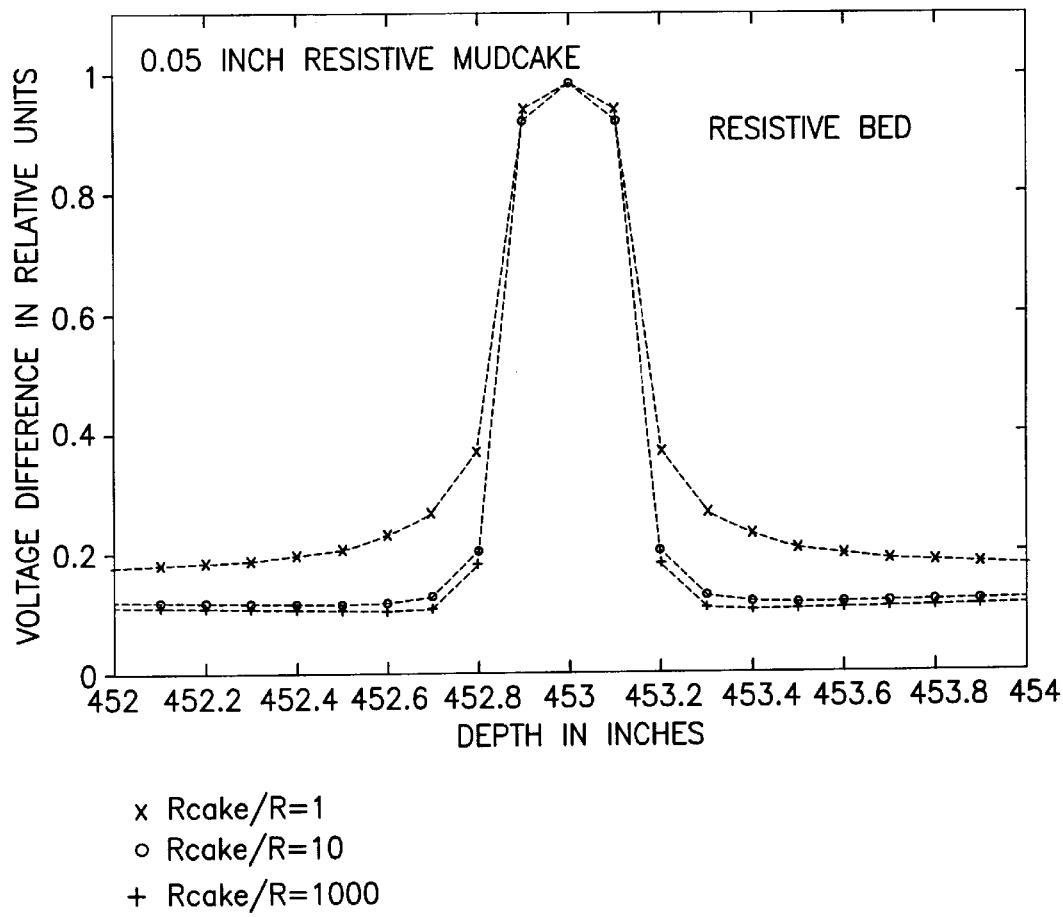
FIG. 8 is a graph similar to FIG. 7 where the measurements have been taken in a resistive bed.

It is believed that the reason why the FMI™ tool produces poor images in an OBM well is that highly resistive mudcakes on the borehole wall interfere with current measurements. Turning now to FIGS. 5–8, the effects of resistive mudcakes were measured with respect to the FMI™ imaging tool (FIGS. 5 and 6) and with respect to the tool according to the invention (FIGS. 7 and 8). As shown in FIGS. 5 and 6, the contrast resolved by the FMI™ imager in both conductive and resistive beds is significantly affected by resistive mudcake. As the resistive ratio (mudcake resistivity bed resistivity) increases, the ability of the FMI™ tool to detect changes in survey currents deteriorates. When the ratio is 100 or higher, the FMI™ tool is substantially incapable of resolving any image. As seen in FIGS. 7 and 8, however, the resolution of the imaging tool of the present invention actually improves in the presence of resistive mudcake. The results shown in FIGS. 7 and 8 relate to mudcakes approximately 0.05 inch thick. Similar tests were performed with thinner (0.025 inch) mudcakes and similar results were obtained. In addition, similar tests were performed with thicker (0.10 inch) mudcakes and similar results were obtained in resistive beds. In conductive beds with thick (0.10 inch) mudcakes, slightly different results were obtained, however. In conductive beds with thick (0.10 inch) mudcake, a noticeable 50% loss in contrast was observed. This loss in contrast is not critical, however, and is not expected to occur in OBM wells.

The tests described above were performed with mudcakes having a uniform thickness and resistivity. It is expected that in practice, mudcakes of variable thickness and resistivity will be encountered. Thus, additional tests were performed with random variations in mudcake thickness and resistivity. The results of these tests were not dramatically different from the results discussed above.

Figure 9:
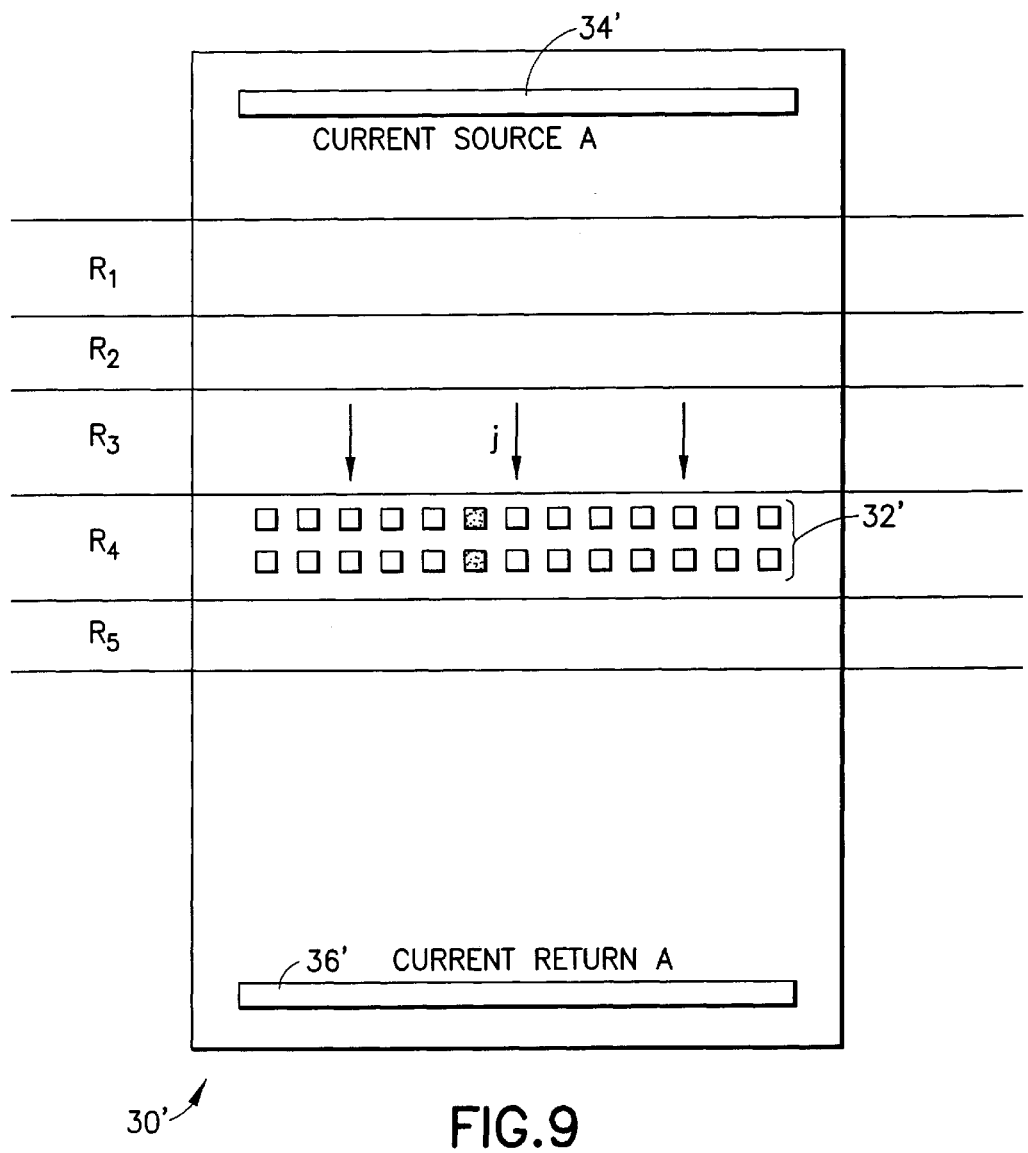
FIG. 9 is a schematic illustration of an alternate, less preferred, embodiment of the invention with current flow properly aligned orthogonal to bed boundaries.
Figure 10:
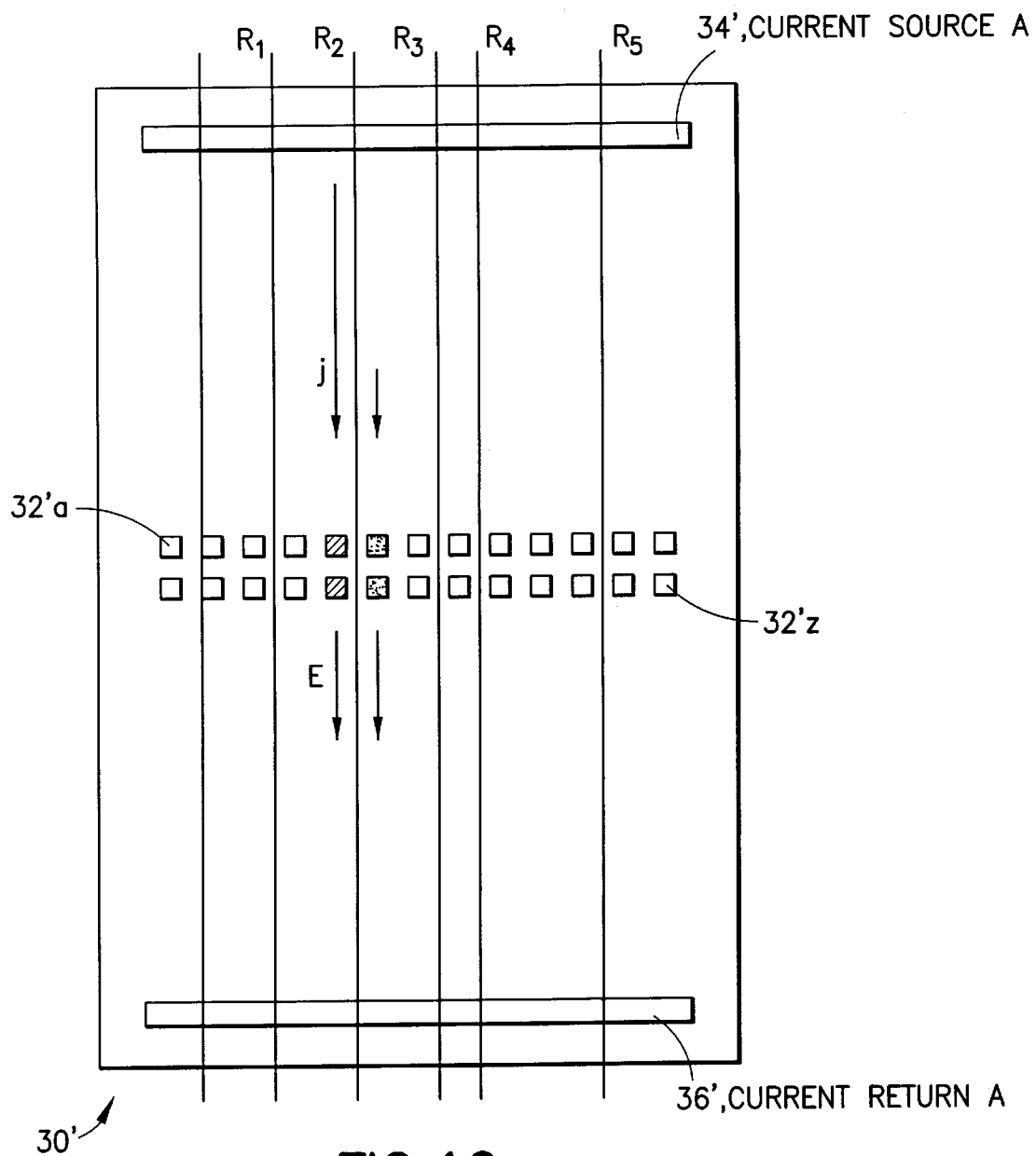
FIG. 10 is a schematic illustration of the embodiment of FIG. 9 where current flow is tangential to bed boundaries.

As mentioned above, the numerical analyses presented herein thus far assume that current flows substantially normal to the bed boundaries. In such an ideal situation, a simplified pad 30' as shown in FIG. 9 is sufficiently provided with a single current source 34' and a single current return 36'. In practice, however, such a one dimensional current flow cannot guarantee that the current will always flow substantially normal to the bed boundaries. For example, as shown in FIG. 10, it is possible that the bed boundaries may be aligned parallel to the current flow, e.g. in a deviated or horizontal well. If this happens, the current flowing through the different beds will not be equal and the voltage differences measured by two pairs of electrodes on opposite sides of a bed boundary will not be meaningful. Those skilled in the art will also appreciate that if any of the beds shown in FIG. 9 are infinitely resistive, no measurements will be possible. Highly resistive streaks are known to occur in earth formations and if such a streak lies between the current source and current return, no current field will be generated and no voltages will be detected.

Figure 3:
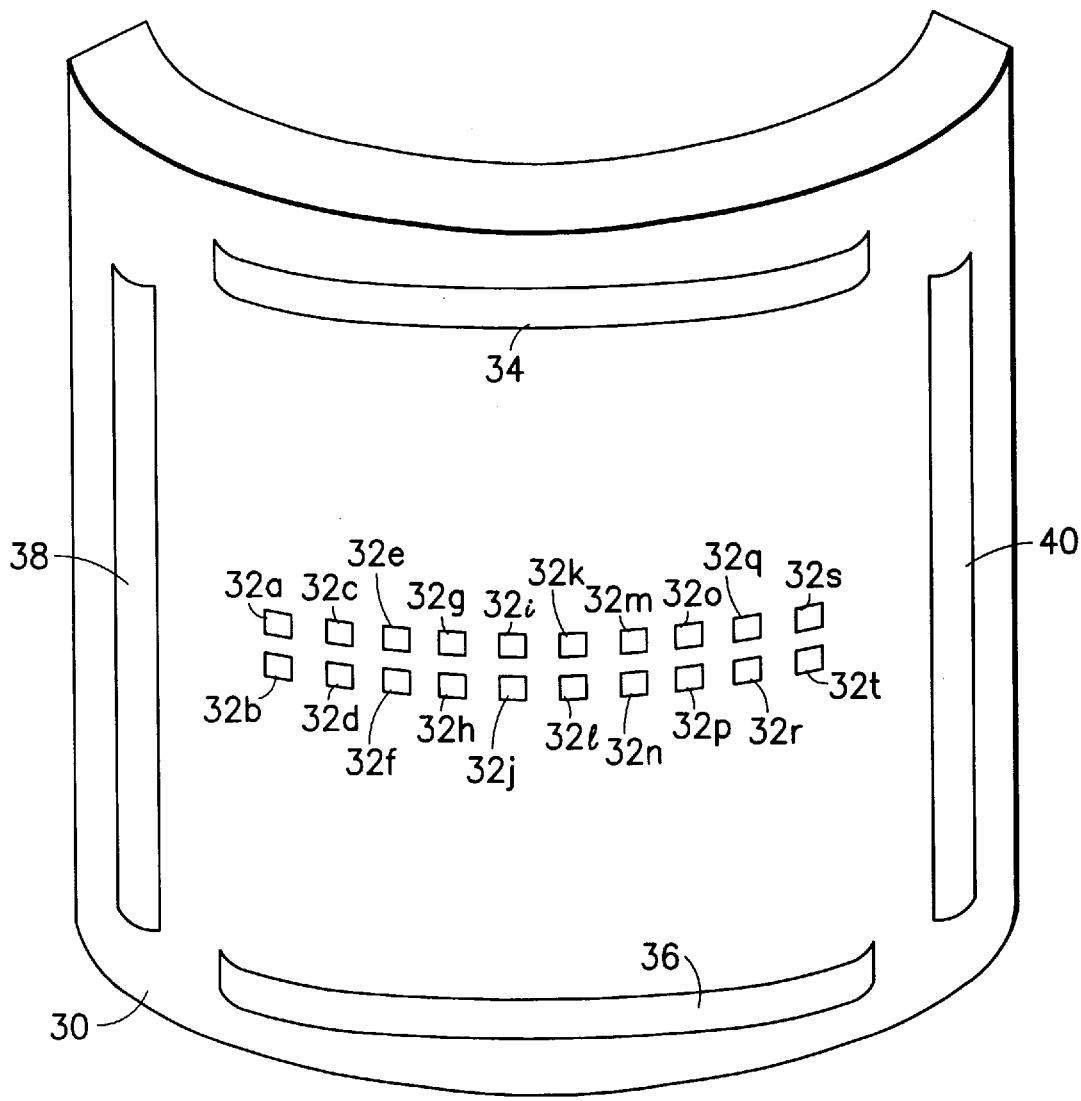
FIG. 3 is a schematic illustration of an electrode pad of an imaging tool according to the invention.
Figure 11:
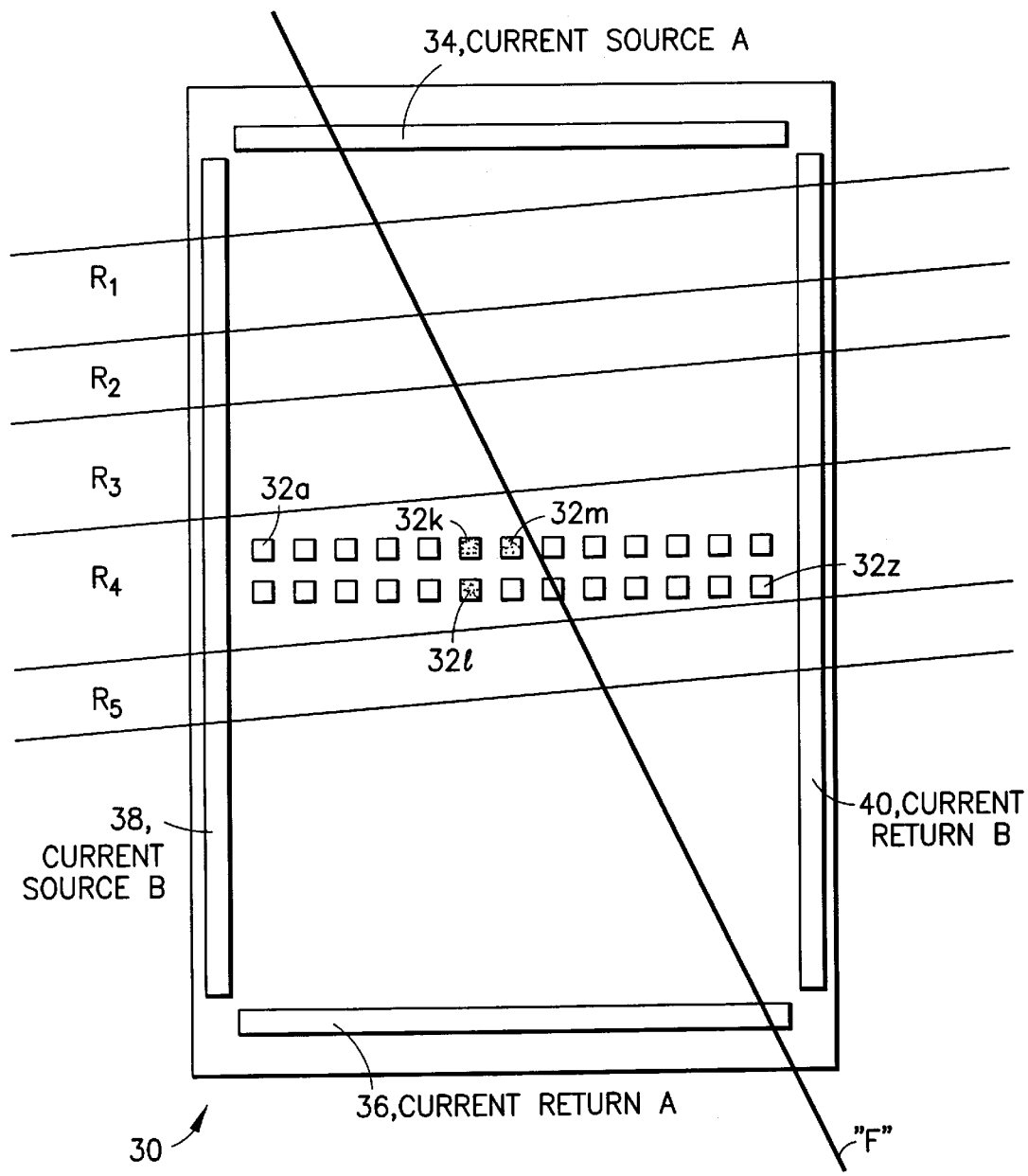
FIG. 11 is a schematic illustration of the more preferred embodiment (also illustrated in FIG. 3) with current flow in two dimensions.

In order to assure that current flow is not tangential to bed boundaries and is not interrupted by a highly resistive streak, it is preferred that the tool be provided with a pair of non-parallel (e.g., orthogonal) current sources and current returns as shown in FIGS. 3 and 11. FIG. 11 also illustrates a complicated bed structure where the beds are dipping and are divided by a high angle dipping fracture shown schematically by the dark black line labelled "F". Under these circumstances, regardless of whether the current source 34 or 38 is fired, neither will result in current flow which is substantially perpendicular to the bed boundaries. In order to account for this alignment, one method of the invention is to measure voltage drop in two directions and perform a vector analysis. For example, measurement of the voltage drop across electrodes 32k and 32l as well as the voltage drop across 32m and 32k can be used as vector components to calculate the current vector which is perpendicular to the bed boundaries. This technique is further enhanced by arranging the voltage electrodes in a matrix having offset rows as shown in FIG. 12.

Figure 12:
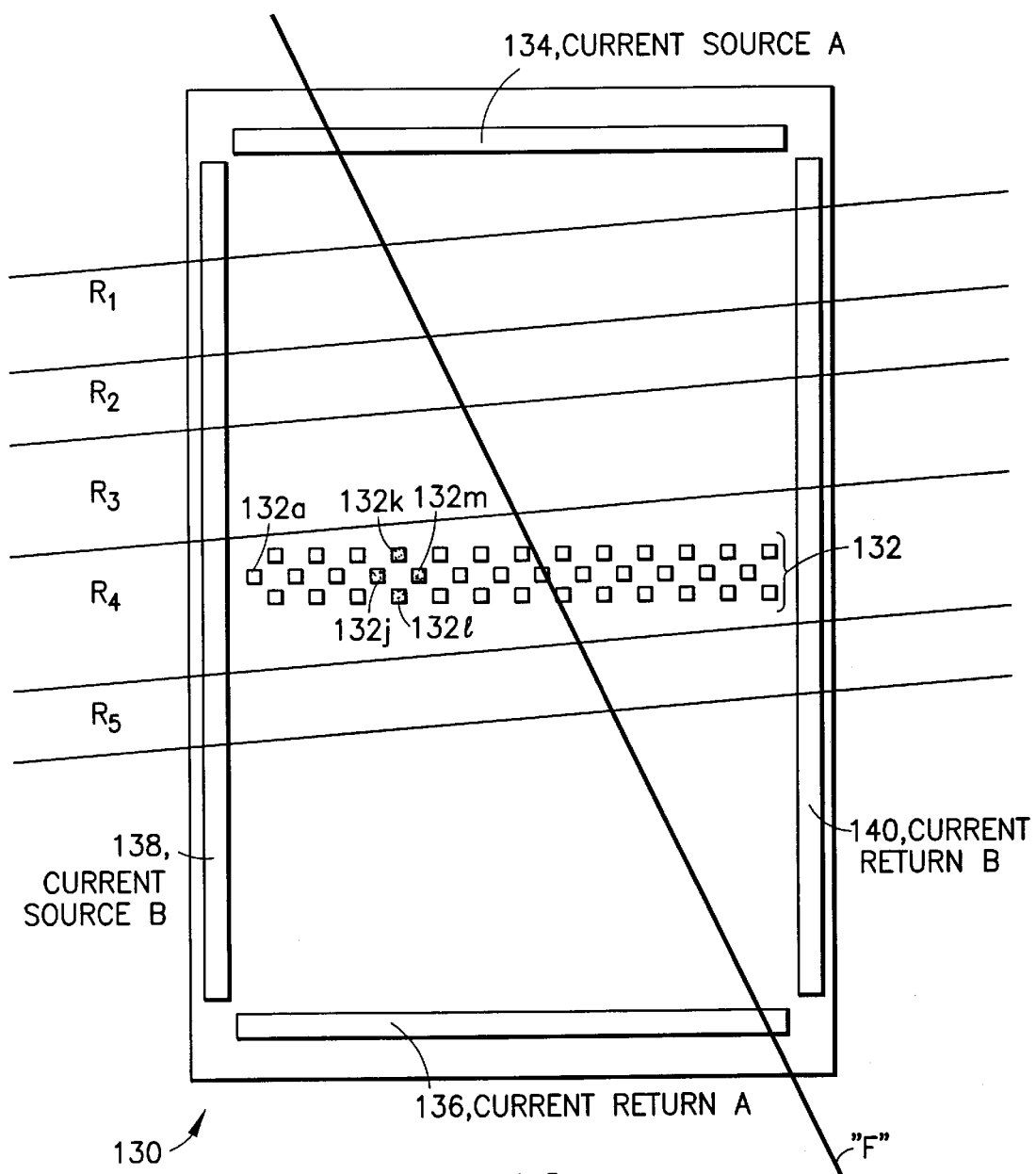
FIG. 12 is a view similar to FIG. 11 of a presently most preferred embodiment of the invention having an optimized electrode arrangement.

Turning now to FIG. 12, a presently most preferred non-conductive sensor pad 130 is similar to the pad 30 described above with similar reference numerals referring to similar structure. The sensor pad 130 is distinguished from the pad 30 in that its individual electrodes 132 are arranged in three rows with one row being offset from the other rows.

The voltage drop across two orthogonal pairs of electrodes such as 132k, 132l and 132j, 132m are used as vector components to calculate the current vector which is perpendicular to the bed boundaries.

Figure 13:
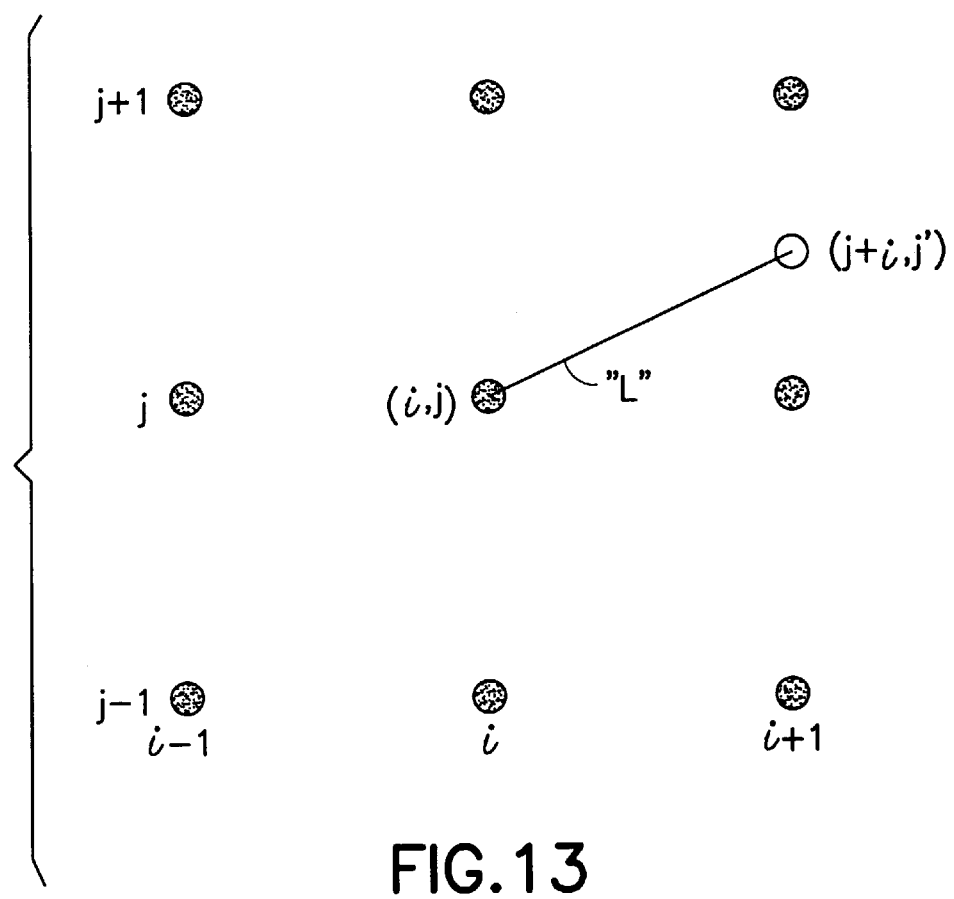
FIG. 13 is a schematic illustration of a matrix of voltage sampling points used to form a resistivity image according to the invention.

It will be appreciated that the arrangement of FIG. 12 involves four voltage measurements for each sampling point in the borehole wall. These four voltage measurements are combined to yield a single resistivity value for each picture element in an image of the borehole wall. Turning now to FIG. 13, picture elements corresponding to nine evenly spaced sampling points are shown schematically using Cartesian coordinates (i,j). It will be appreciated, however, that in practice, the ordinate "i" will follow a circular path about the borehole wall. For the purpose of illustration, it is assumed that the current flow vector which is perpendicular to the bed boundaries lies along the line "L" in FIG. 13 and passes through the points (i,j) and (i+1,j') where j<j'<j+1, and the point (i+1,j') is not a sampling point. Based upon relationship (7) above, it will be appreciated that the ratio of the voltage drop at point (i,j) compared to the voltage drop at point (i+1,j') should be equal to the ratio of the resistivities at these points according to relationship (8) below where Æ indicates voltage drop and R indicates resistivity:

$$\frac{\Delta_{i,j}}{\Delta_{i+1,j'}} = \frac{R_{i,j}}{R_{i+1,j'}} \tag{8}$$

In accord with a method of the invention, logarithms are used to reconstruct the resistivity image from four independent measurements. For example, if Y is the natural log of R and S is the natural log of Æ, the proportion of relationship (8) can be expressed as the equality $$Y_{ij} - Y_{i+1,j'} = S_{ij} - S_{i+1,j'} \tag{9}$$

With the relationship between voltage drop and resistivity expressed in terms of logarithms, a linear interpolation logarithm can be applied to determine the values of Y and S at the point (i+1,j') from the values actually measured at nearby sampling points. If the fractional component of j' is called α such that j'=j+α and 0<α<1, then the values of Y and S at the point (i+1,j') can be expressed in terms of the values at nearby sampled points according to $$Y_{i+1,j'} = (1-\alpha)Y_{i+1,j} + \alpha Y_{i+1,j+1}, \tag{10}$$

$$S_{i+1,j'} = (1-\alpha)S_{i+1,j} + \alpha S_{i+1,j+1} \tag{11}$$

By substituting values of relationships (10) and (11) into (9), the following is obtained:

$$Y_{ij} - (1-\alpha)Y_{i+1,j} - \alpha Y_{i+1,j+1} = S_{ij} - (1-\alpha)S_{i+1,j} - \alpha S_{i+1,j+1} \tag{12}$$

Those skilled in the art will appreciate that solving relationship (12) for every voltage drop measurement is difficult because of the number of unknowns. Thus, in order to get a best solution for relationship (12), it is preferable to minimize the following cost function which contains the term $I_{i,j}$ $$I_{ij} = [Y_{ij} - (1-\alpha)Y_{i+1,j} - \alpha Y_{i+1,j+1} - S_{ij} - (1-\alpha)S_{i+1,j} - \alpha S_{i+1,j+1}]^2 \tag{13}$$

Relationship (13) represents only one of eight possible solutions depending on the slope of the line "L" in FIG. 13. As the coordinates (i,j) are only incremented by one unit, the relationship (13) applies only to the case where the slope of line "L" is between 0° and 45°. In order to cover the case where the slope of line "L" is between 45° and 90°, the index (i+1,j) in relationship (13) must be changed to (i+1,j+1) and the index (i+1,j+1) in relationship (13) must be changed to (i+1,j). Those skilled in the art will thus appreciate that appropriate indices of the form (i±1,j±1) must be substituted in relationship (13) to create a separate equation of each of the 45° octants surrounding the point (i,j) in FIG. 13.

The cost function to be minimized is given in relationship (14) where the first sum is taken over two different pairs of current source and current return, and the second sum is taken over all sampled points:

$$I = 3 \sum_{i,j} 3 \, I_{i,j} \tag{14}$$

The resistivity image is reconstructed by minimizing the cost function I in relationship (14) with respect to $Y_{ij}$. The result of minimization is a set of linear equations in $Y_{i,j}$ which may be solved according to any known technique in the art. For a given row "j", $Y_{i,j}$ is only coupled only to the given row j and two adjacent rows j±1. Therefore the linear equations can be set up as a tridiagonal block matrix equation where each block consists of $Y_{i,j}$ for a given row, and the tridiagonal block matrix equation may be solved according to techniques well known in the art.

There have been described and illustrated herein several embodiments of a method and apparatus for electrically analyzing a borehole penetrating an earth formation. While particular embodiments of the invention have been described, it is not intended that the invention be limited thereto, as it is intended that the invention be as broad in scope as the art will allow and that the specification be read likewise. Thus, while particular numbers of electrode buttons have been disclosed, it will be appreciated that other numbers could be utilized with consequent increase. Also, while a particular tool has been shown for carrying the electrode pad(s) of the invention, it will be recognized that other types of borehole tools could be used with similar results obtained. Moreover, while particular configurations have been disclosed in reference to state of the art processing of signals, it will be appreciated that other configurations could be used as well. For example, it will be understood that the voltage measurements made downhole may be transmitted uphole (with or without compression) for processing uphole, or some or all of the signal processing may be accomplished downhole with partial or final results transmitted uphole. Further, while particular circuitry and particular processing techniques were described, it will be appreciated that different circuitry and/or software could be utilized. It will therefore be appreciated by those skilled in the art that yet other modifications could be made to the provided invention without deviating from its spirit and scope as so claimed.

What is claimed is:

1. An apparatus for use in a borehole investigating tool which is movable through the borehole for investigating the wall of the borehole, said apparatus comprising:

a) a non-conductive pad adapted to be pressed against the borehole wall;

b) a matrix of voltage electrodes carried on said non-conductive pad and adapted to sense voltages at the borehole wall, said matrix of voltage electrodes comprising at least six electrodes including at least three equally spaced pairs, with each of a first group of three electrodes of said at least six electrodes being horizontally displaced relative to the others of said first group of three, and each electrode of a pair being vertically displaced relative to another electrode of said pair;

c) a first current source electrode adapted to inject a current into the borehole wall; and d) a first current return electrode adapted to drain current from the borehole wall at a location spaced apart from said first current source electrode, said matrix of voltage electrodes being located between said first current source electrode and said first current return electrode.

2. An apparatus according to claim 1, wherein:

at least one of said first current source electrode and said first current return electrode are carried on said non-conductive pad.

3. An apparatus according to claim 1, further comprising:

e) a current supply coupled to said first current source electrode and said first current return electrode; and f) voltage measuring means coupled to each pair of electrodes in said matrix of voltage electrodes for measuring voltage differences between electrodes in each pair of electrodes in said matrix of voltage electrodes.

4. An apparatus according to claim 1, further comprising:

e) a second current source electrode and adapted to inject a current into the borehole wall; and f) a second current return electrode adapted to drain current from the borehole wall at a location spaced apart from said second current source electrode, said second current source electrode and said second current return electrode being located substantially non-parallel to said first current source electrode and said first current return electrode.

5. An apparatus according to claim 4, wherein:

at least one of said first current source electrode, said second current source electrode, said first current return, and said second current return electrode are carried on said non-conductive pad.

6. An apparatus according to claim 4, wherein:

said first current source electrode, said second current source electrode, said first current return, and said second current return electrode are carried on said non-conductive pad.

7. An apparatus according to claim 4, further comprising:

g) a current supply coupled to said first current source electrode, said first current return electrode, said second current source electrode, and said second current return electrode; and h) voltage measuring means coupled to said matrix of voltage electrodes for measuring voltage differences between electrodes in said matrix of voltage electrodes.

8. An apparatus according to claim 7, wherein:

said matrix of voltage electrodes includes three rows of electrodes, each row having a plurality of electrodes arranged in columns, at least one of said rows having columns offset from columns of another of said rows.

9. An apparatus according to claim 8, wherein:

said voltage measuring means includes means for determining the difference in voltage between an electrode in one row and an electrode in another row as well as means for determining the difference in voltage between two electrodes in the same row.

10. An apparatus according to claim 9, further comprising:

h) signal processing means coupled to said voltage measuring means for generating a resistivity image based on voltage differences measured by said voltage measuring means.

11. An apparatus according to claim 10, wherein:

said signal processing means generates said resistivity image by comparing pairs of voltage differences.

12. An apparatus for electrically imaging the wall of a borehole in an earth formation having a plurality of beds separated by bed boundaries, said apparatus comprising:

a) current generating means for generating a current flow through a portion of the formation such that current density near the wall of the borehole adjacent to said portion of the formation is substantially non-parallel to bed boundaries;

b) voltage measuring means for measuring voltage at the wall of the borehole adjacent to said portion of the formation, said voltage measuring means comprising at least six electrodes including at least three equally spaced pairs, with each of a first group of three electrodes of said at least six electrodes being horizontally displaced relative to the others of said first group of three, and each electrode of a pair being vertically displaced relative to another electrode of said pair; and c) signal processing means coupled to said voltage measuring means for generating a resistivity image of the wall of the borehole based on voltage measured by said voltage measuring means.

13. An apparatus according to claim 12, wherein:

said voltage measuring means includes first, second, third, and fourth electrodes, and means for comparing the voltage difference between said first and second electrode with the voltage difference between said third and fourth electrode.

14. An apparatus according to claim 13, wherein:

said first and second electrodes are spaced apart from each other in a first direction, and said second and third electrodes are spaced apart from each other in a second direction which is substantially non-parallel to said first direction.

15. An apparatus according to claim 12, wherein:

said current generating means includes means for generating current flow through said portion of the formation in two substantially non-parallel directions.

16. An apparatus according to claim 13, wherein:

said first electrode lies in a first row of electrodes, said second electrode lies in a second row of electrodes, said third and fourth electrodes lie in a third row of electrodes, and said third row is located in between said first row and said second row.

17. A method for electrically imaging the wall of a borehole in an earth formation having a plurality of beds separated by bed boundaries utilizing a tool having a plurality of electrodes, said method comprising:

a) generating a current flow through a portion of the formation such that current density near the wall of the borehole adjacent to said portion of the formation is substantially non-parallel to bed boundaries;

b) using the electrodes in pairs, measuring a plurality of voltages at the wall of the borehole; and c) generating a resistivity image of the wall of the borehole based on a plurality of differences in voltages measured by electrodes in each pair, wherein said step of generating a current flow includes generating current flow through the portion of the formation in two substantially non-parallel directions.

18. A method according to claim 17, wherein:

said step of measuring comprises comparing the voltage difference between a first and second electrode of the plurality of electrodes with the voltage difference between a third and fourth electrode of the plurality of electrodes.

19. A method according to claim 18, wherein:

the first and second electrodes are spaced apart from each other in a first direction, and the second and third electrodes are spaced apart from each other in a second direction which is substantially non-parallel to said first direction.

20. An apparatus according to claim 1, wherein:

said at least six electrodes are arranged in two horizontal rows of three each.

21. An apparatus for use in a borehole investigating tool which is movable through the borehole for investigating the wall of the borehole, said apparatus comprising:

a) a non-conductive pad adapted to be pressed against the borehole wall;

b) a matrix of voltage electrodes carried on said non-conductive pad and adapted to sense voltages at the borehole wall;

c) a first current source electrode adapted to inject a current into the borehole wall;

d) a first current return electrode adapted to drain current from the borehole wall at a location spaced apart from said first current source electrode, said matrix of voltage electrodes being located between said first current source electrode and said first current return electrode;

e) a second current source electrode and adapted to inject a current into the borehole wall; and f) a second current return electrode adapted to drain current from the borehole wall at a location spaced apart from said second current source electrode, said second current source electrode and said second current return electrode being located substantially non-parallel to said first current source electrode and said first current return electrode.

22. An apparatus according to claim 21, wherein:

at least one of said first current source electrode, said second current source electrode, said first current return, and said second current return electrode are carried on said non-conductive pad.

23. An apparatus according to claim 21, wherein:

said first current source electrode, said second current source electrode, said first current return, and said second current return electrode are carried on said non-conductive pad.

24. An apparatus according to claim 21, further comprising:

g) a current supply coupled to said first current source electrode, said first current return electrode, said second current source electrode, and said second current return electrode; and h) voltage measuring means coupled to said matrix of voltage electrodes for measuring voltage differences between electrodes in said matrix of voltage electrodes.

25. An apparatus according to claim 24, wherein:

said matrix of voltage electrodes includes three rows of electrodes, each row having a plurality of electrodes arranged in columns, at least one of said rows having columns offset from columns of another of said rows.

26. An apparatus according to claim 25, wherein:

said voltage measuring means includes means for determining the difference in voltage between an electrode in one row and an electrode in another row as well as means for determining the difference in voltage between two electrodes in the same row.

27. An apparatus according to claim 26, further comprising:

h) signal processing means coupled to said voltage measuring means for generating a resistivity image based on voltage differences measured by said voltage measuring means.

28. An apparatus according to claim 27, wherein:

said signal processing means generates said resistivity image by comparing pairs of voltage differences.

29. An apparatus for electrically imaging the wall of a borehole in an earth formation having a plurality of beds separated by bed boundaries, said apparatus comprising:

a) current generating means for generating a current flow through a portion of the formation such that current density near the wall of the borehole adjacent to said portion of the formation is substantially non-parallel to bed boundaries;

b) a plurality of voltage measuring means adjacent to said portion of the formation for measuring a plurality of voltages at the wall of the borehole; and c) signal processing means coupled to said plurality of voltage measuring means for generating a resistivity image of the wall of the borehole based on the plurality of voltages measured by said plurality of voltage measuring means, wherein said current generating means includes means for generating current flow through said portion of the formation in two substantially non-parallel directions.

30. An apparatus for electrically imaging the wall of a borehole in an earth formation having a plurality of beds separated by bed boundaries, said apparatus comprising:

a) current generating means for generating a current flow through a portion of the formation such that current density near the wall of the borehole adjacent to said portion of the formation is substantially non-parallel to bed boundaries;

b) a plurality of voltage measuring means adjacent to said portion of the formation for measuring a plurality of voltages at the wall of the borehole; and c) signal processing means coupled to said plurality of voltage measuring means for generating a resistivity image of the wall of the borehole based on the plurality of voltages measured by said plurality of voltage measuring means, wherein said plurality of voltage measuring means includes first, second, third, and fourth electrodes, and means for comparing the voltage difference between said first and second electrode with the voltage difference between said third and fourth electrode, said first electrode lies in a first row of electrodes, said second electrode lies in a second row of electrodes, said third and fourth electrodes lie in a third row of electrodes, and said third row is located in between said first row and said second row.

31. A method for electrically imaging the wall of a borehole in an earth formation having a plurality of beds separated by bed boundaries utilizing a tool having a plurality of electrodes, said method comprising:

a) generating a current flow through a portion of the formation such that current density near the wall of the borehole adjacent to said portion of the formation is substantially non-parallel to bed boundaries;

b) using the electrodes, measuring a plurality of voltages at the wall of the borehole; and c) generating a resistivity image of the wall of the borehole based on the plurality of voltages measured, wherein said step of generating a current flow includes generating current flow through the portion of the formation in two substantially non-parallel directions.

* * * * *